United States Patent [19]
LaStrange et al.

[11] Patent Number: 6,148,298
[45] Date of Patent: Nov. 14, 2000

[54] SYSTEM AND METHOD FOR AGGREGATING DISTRIBUTED DATA

[75] Inventors: Thomas Eric LaStrange, Colorado Springs; Monty Lee Hammontree, Monument, both of Colo.

[73] Assignee: ChannelPoint, Inc., Colorado Springs, Colo.

[21] Appl. No.: 09/220,968

[22] Filed: Dec. 23, 1998

[51] Int. Cl.$^7$ .............................. G06F 17/30; G06F 17/60
[52] U.S. Cl. ........................ 707/5; 707/3; 707/1; 707/10
[58] Field of Search .................................. 707/1–6, 8, 10, 707/104

[56] References Cited

U.S. PATENT DOCUMENTS

| | | | |
|---|---|---|---|
| 5,897,622 | 4/1999 | Blinn et al. ................................ | 705/26 |
| 5,913,210 | 6/1999 | Call ............................................ | 707/4 |
| 5,974,415 | 10/1999 | Schreiber .................................... | 707/6 |

FOREIGN PATENT DOCUMENTS

0639814A1  2/1995  European Pat. Off. ........ G06F 17/30

OTHER PUBLICATIONS

Goldfarb, Charles F. and Prescod, Paul; *The XML Handbook*, 1998, pp. 133–138 and 387–393.

*Primary Examiner*—Thomas G. Black
*Assistant Examiner*—Uyen Le
*Attorney, Agent, or Firm*—Stuart T. Langley; William J. Kubida; Hogan & Hartson LLP

[57] ABSTRACT

A method for aggregating distributed information from a plurality of data sources each having an address. A plurality of user criteria are received and site specific information describing idiosyncrasies of each data source are stored. A plurality of query messages are generated based upon the received criteria and the stored idiosyncrasy information. For each query message, a communication packet is generated comprising the query message and an address for the corresponding data source. A plurality of communication ports are created with each port associated with one of the communication packets. Each communication packet is sent over its associated port to the addressed data source.

12 Claims, 4 Drawing Sheets

SYSTEM AND METHOD FOR AGGREGATING DISTRIBUTED DATA

BACKGROUND OF THE INVENTION

1. Field of the Invention

The present invention relates, in general, to systems for systems for accessing product information and, more particularly, to systems for accessing current insurance product information from a variety of distributed non-uniform data sources.

2. Relevant Background

The insurance industry markets insurance products based upon the product coverage and health care providers that participate in the particular product. Each insurance carrier offers a variety of products and each product typically has a unique set of participating providers. Especially in the case of small insurance plans (e.g., fewer than 100 participants) the plans are marketed through brokers. Brokers may represent several insurance carriers and within each carrier a variety of insurance plans. In most instances the broker does not have specific knowledge on hand about the many plans offered and will rarely have up-to-date knowledge of the participating health care providers for each product.

Purchasers often specify certain criteria that are desired in an insurance product. For example, purchasers often want to know that a set of preferred health care providers participate in the plan they are purchasing. Because brokers do not have this specific knowledge at hand, they must delay the purchase transaction to research each potential plan with each potential carrier to find whether each purchaser specified criteria is met. This is typically done manually by searching through printed materials provided by the carriers. More recently, carriers provide up-to-date information on databases accessible through public networks such as the Internet.

Unfortunately, even public databases require that the broker know the idiosyncrasies of each data source (e.g., access protocol, security protocol, and searchable fields). Further, each broker must know the unique format in which the requested data is returned in order to make sense of the search results. Even when complete results are obtained, the results must be manually reformatted and aggregated into an understandable format. This manual process is time consuming and can result in inaccuracy as well as incomplete information. A need exists for an automated method for aggregating data from a plurality of disparate data sources.

SUMMARY OF THE INVENTION

Briefly stated, the present invention involves a computer implemented method for aggregating distributed information from a plurality of data sources each having an address. A plurality of user criteria are received and site specific information describing idiosyncrasies of each data source are stored. A plurality of query messages are generated based upon the received criteria and the stored idiosyncrasy information. For each query message, a communication packet is generated comprising the query message and an address for the corresponding data source. A plurality of communication ports are created with each port associated with one of the communication packets. Each communication packet is sent over its associated port to the addressed data source.

DETAILED DESCRIPTION OF THE PREFERRED EMBODIMENTS

The present invention is directed to a system and method for obtaining product information and is particularly illustrated in terms of a system for aggregating insurance product information from a variety of distributed, diverse data sources. However, it is contemplated that the present invention has utility well beyond the insurance industry and even beyond the field of aggregating product data. Accordingly, the teachings of the present invention can be usefully applied to in many applications involving data access and retrieval from distributed data sources having disparate interfaces and is not limited by the specific embodiments and implementations described herein.

Figure 1:
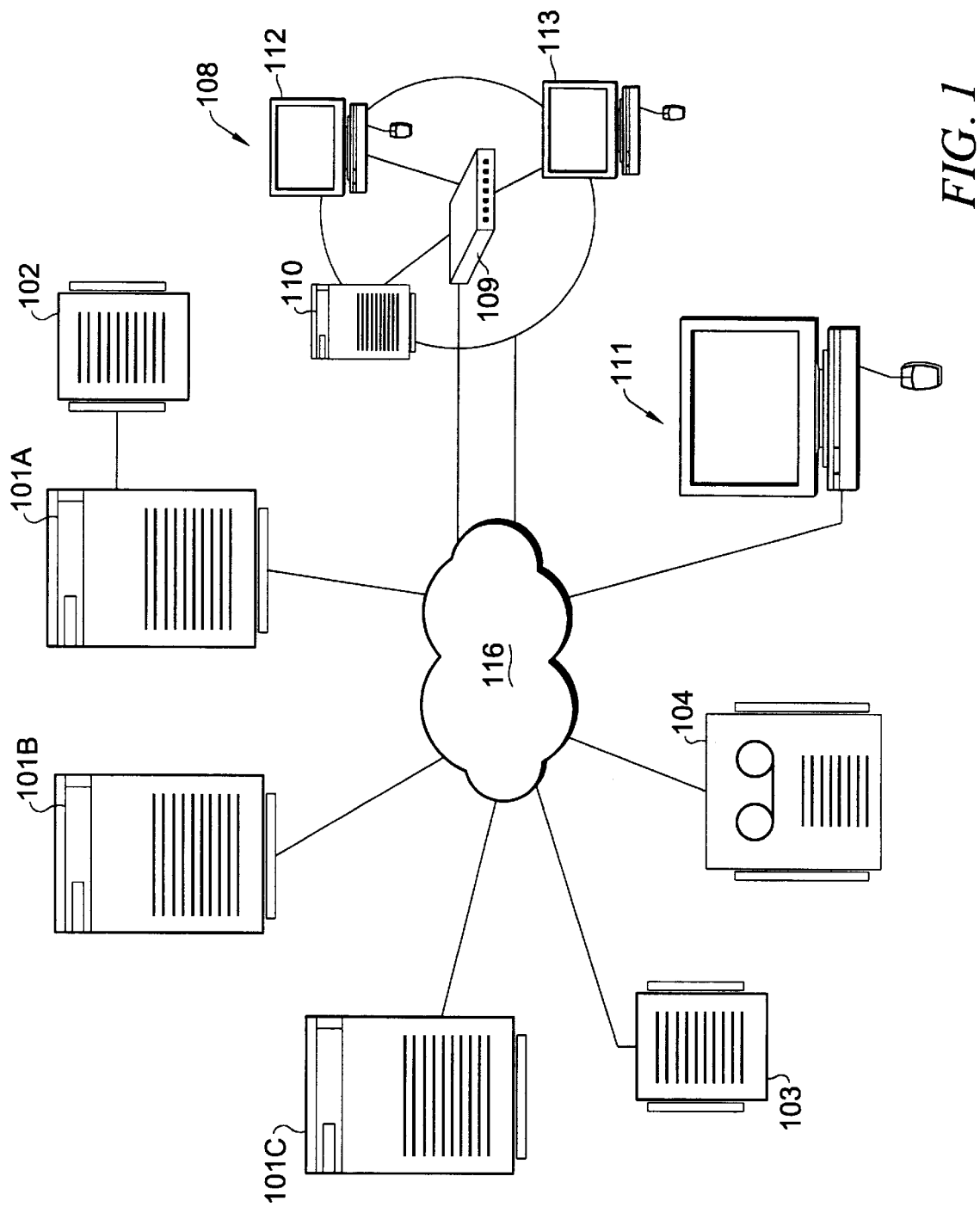
FIG. 1 shows a networked computer environment implementing the system, method and devices in accordance with the present invention.

FIG. 1 illustrates a typical distributed computing environment in which the present invention may be implemented. In overview, FIG. 1 shows general and/or special purpose computers, workstations or personal computers that are connected via communications links of various types.

The representative computer system shown in FIG. 1 includes a workstation or personal computer (PC) 111 coupled to communicate with other devices through a network, fiber or other data communication "cloud" 116. Workstation 111 typically includes input/output ("I/O") devices, Central Processing Unit ("CPU") and memory sections (not shown) and an associated monitor for interacting with a user. A variety of input devices, such as a mouse or keyboard, form a portion of the workstation 101 and are coupled to the I/O section to provide user input data.

Servers such as 101A, 101B, and 101C (referred to collectively as servers 101) are accessible through the network 116 to provide requested data and services to users such as workstation 111. Servers 101 typically include mass storage devices such as CDROM and hard disk devices (not shown) for read only and read-write storage. Additionally, servers 111 may access external mass storage devices such as disk array 102 that is directly connected to server 101A and disk array 103 and tape storage 104 that are coupled through connections to network 116.

Network 116 may be implemented as a wide area network (WAN), local area network (LAN) and may use any available technology for establishing communication links such as Ethernet, Fibre Channel (FC), transfer connection protocol (TCP), Internet Protocol (IP), asynchronous transfer mode (ATM), digital subscriber line (DSL), and the like. Network 116 may also couple to external LAN or WAN subnetworks such as LAN 108 including workstations 112 and 113 and a server 110 coupled together by a hub 109.

Each server 101 serves to provide requested data in response to request data packets received from network 116. In accordance with the present invention, each server 101 can have a unique interface, data format, query syntax, security protocol, and the like. For example, server 101A may be configured as a web server and so responds to hypertext transfer protocol (HTTP) request packets and generates responses formatted as hypertext markup language (HTML) web pages. In contrast other servers 101 may use file transfer protocol (FTP) or other available transfer protocols, both public and private.

In a particular example, each server 101A–101C implements an insurance carriers product web server that hosts a "website" having a predefined structure and access syntax and protocol. In general each website is designed to provide information about insurance product offerings and participating health care providers in response to queries communicated through network 116. Because each server 101 is created and maintained by a separate insurance carrier, there is no uniform interface provided for interacting with the various servers 101.

For example, server 101A may enable searches by last name, phone number, zip code, or other searchable fields whereas server 101B may enable searches only by last name. Accordingly, the data request messages must differ in content to evoke the desired response from each server 101. Also, server 101A may require that a query be processed through a series of pages before a response is generated. In contrast, server 101B may allow direct, one-page access to submit queries and generate responses. Hence, server 101A will require a series of communication packets to be sent by a user before the desired response is generated whereas server 101B is potentially accessed with a single communication packet that encapsulates the desired query data.

The communication process involves a request message generated by computer 111 that is addressed to a specific server 101. The request message is processed by the receiving server 101 which responds by returning a web page in HTML format. In conventional applications where the computer 111 is running a web browsing application, the HTML page is rendered and displayed on the requesting computer 111. This process of request-response-display is referred to herein as a "transaction".

Some data accesses require multiple transaction to deliver the desired data to the requesting computer 111. In the case of complex websites, each webpage that the server must sequence through requires a separate transaction. Some pages may limit the generated output to a specified number of output records thereby requiring a variable number of transactions. Until now, such disparities have been handled manually by enabling the user to interact with the website through the browser application to manually retrieve and collect the results. It is readily apparent that in order to conduct transactions with multiple data sources over multiple records with each record taking multiple transactions to complete, the number of transactions and the time required to complete these data access requests escalates exponentially.

The computer program products containing mechanisms to effectuate the apparatus and methods of the present invention may reside in the memory and mass storage portions of the workstations 111, 112 and 113. The computer program products containing mechanisms to effectuate the apparatus and methods of the present invention are readily embodied in magnetic, optical, magneto-optical or other available machine readable encoding systems.

Figure 2:
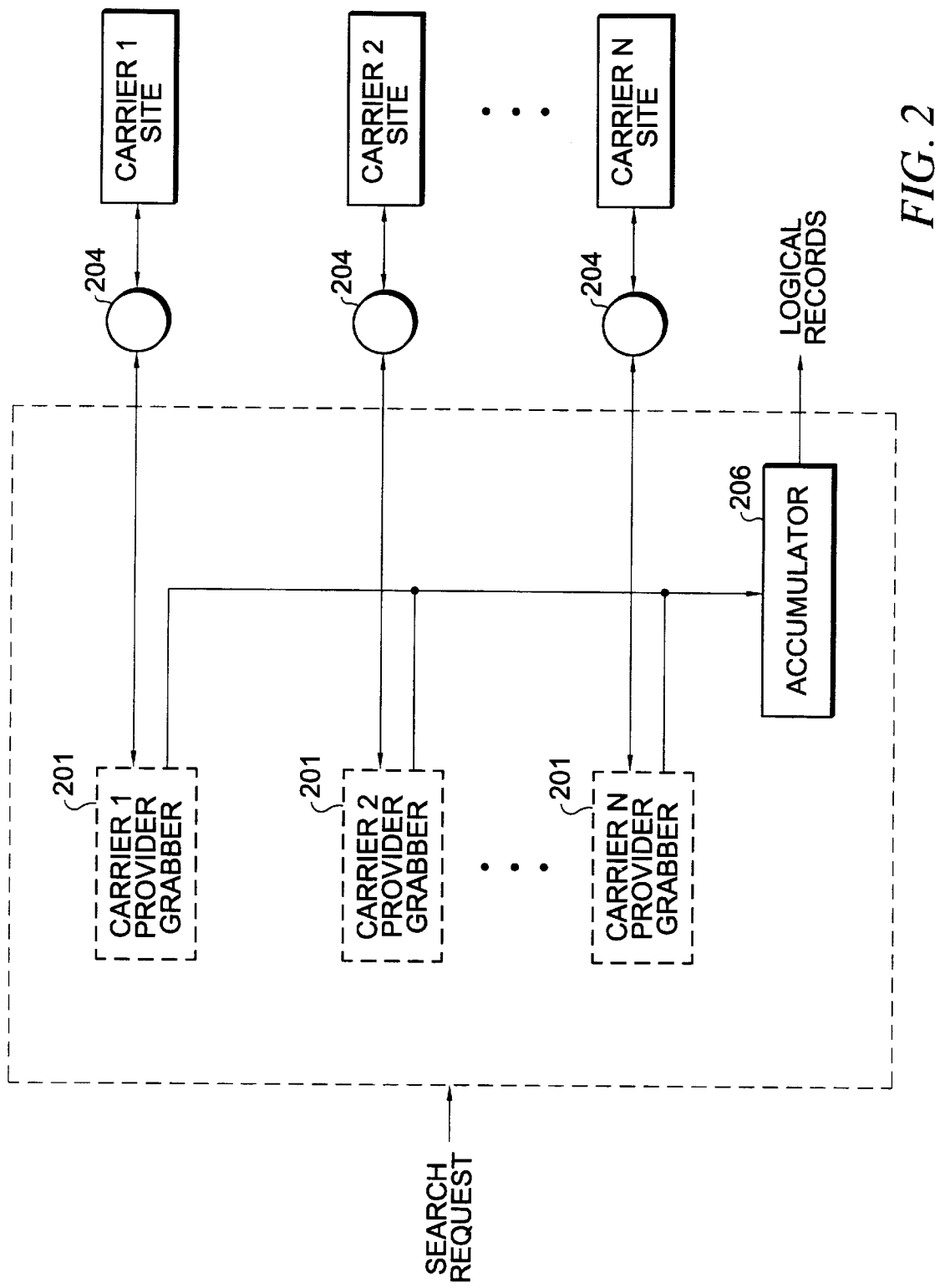
FIG. 2 illustrates basic program devices in accordance with an embodiment of the present invention.

FIG. 2 shows a block diagram of significant components in accordance with the present invention. The components shown in FIG. 2 are conveniently implemented as computer program devices in a programmable computer such as computer 111 shown in FIG. 1. The program devices can be readily stored in memory and/or mass storage devices and called into memory for execution on a processor.

A cross-carrier provider search module 200 receives a generic search request from, for example, the user interface of a computer 111. The generic search request does not have to specify a particular carrier site or be formatted with any site-specific semantics. Provider search module 200 creates instances of one or more carrier provider grabber units 201 to handle the search request. Details of the carrier provider grabber units 201 are described with reference to FIG. 3 below.

In operation, each carrier provider grabber initiates a connection to a particular carrier web site through a port 204. Port 204 comprises, for example, a socket established through conventional network protocol software or the equivalent. Carrier provider grabbers 201 generate and receive messages in the form of., for example, HTTP packets. Returned information from a plurality of carrier provider grabber's 201 is accumulated by accumulator 206 to generate logical records that use by other program components.

A significant feature of the present invention is that carrier provider grabbers 201 create (or causes the creation in a separate network protocol stack) of a plurality of communication sockets 204. Provider grabbers 201 create a separate socket 204 for each carrier site thereby creating an independent bi-directional communication link associated with each access message. Preferably provider grabber 201 can create an arbitrarily large number of sockets limited only by the physical resources of the computer 111 in which the computer program devices are implemented.

The arbitrarily large number of sockets 204 enables the present invention to "broadside" network 116 with multiple parallel request message. Where possible, request messages are issued asynchronously before prior issued request messages have received a response. Some request messages must be issued in a predefined series as determined by the information in adapter module 203, however, many request messages are independent and need no synchronization. In this manner, the substantially large number of transactions required to assembly the desired data can be conducted in parallel within a few milliseconds.

Figure 3:
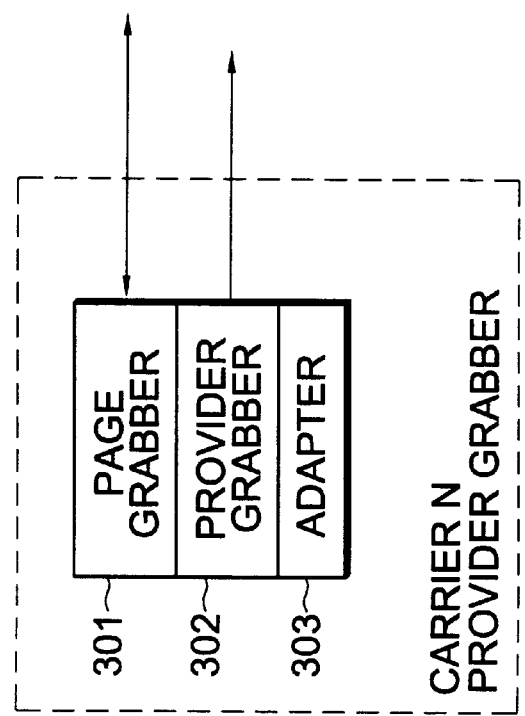
FIG. 3 illustrates details of a carrier provider grabber device 201 in accordance with the present invention.

FIG. 3 illustrates details of a carrier provider grabber device 201 in accordance with the present invention. Page grabber 301 is a generic component that generates data request messages and associates each message with an address (e.g., a uniform resource locator or "URL") to direct the message to a data source. Page grabber 301 may also include program devices that encapsulate the request message and address in an appropriate communication packet (e.g., an HTTP or TCP/IP packet) suitable for transmission on network 116. Alternatively, these elements can be implemented using available network protocol stack mechanisms addressed by page grabber unit 101 through the protocol stack's application interface.

Page grabber 301 contains generic components meaning that they are preferably not specially adapted to generate messages for any particular data source. To determine the source specific message content and the source-specific number of messages page grabber 301 obtains source-specific information from adapter modules 303. Adapter modules 303 comprise thin layers of code that are specifically designed to include the source specific information required to access and process data from a particular site. Page grabber 301 is responsive to adapter modules 303 to generate appropriate messages.

Page grabber 301 also serves to receive response messages from the disparate data sources for each transaction through sockets 204. These response messages are typically in the form of web pages intended for use by a conventional browser application. Page grabber 301 sends these response messages to provider grabber device 302 that servers to parse the response message to identify data within the message. In the preferred implementation, provider grabber 302 also comprises generic code in that it process all response messages without regard to the data source sending the response message. Provider grabber can extract, for example, text fields while removing graphic information, remove HTML markup codes, extract key information such as names, city names, phone numbers, and the like while omitting extraneous data such as formatting information. Provider grabber 302 outputs a set of data items of varied formats that are essentially raw data to adapter modules 303.

Adapter modules 303 include routing logic that recognizes the source identification of the data source participating in each transaction. Each data source has a corresponding adapter 303 that is specifically designed for that source. When a data source changes, the adapter will likely break. However, such a break will not interrupt the entire system and can be repaired by modifying only the code of the adapter module 303 associated with the changed data source.

In addition to the source-specific information used by page grabber 301 to generate request messages, adapter modules 303 also include computer code devices that perform source-specific data translations to reformat the data sets provided by provider grabber 302 into meaningful data associations. For example, a text string "SMITH, J. E." can be associated with a health care provider name. In another adapter 303, the text string may comprise "John Elbert Smith" that would not be recognized by the first adapter 303, but would be recognized by another adapter 303 specifically adapted to understand the returned data format of its associated data source 101.

Adapters 303 generate an output comprising one or more "physical records". In contrast to the raw data provided by provider grabber 302, these physical records are characterized in that each data field is associated with a record type that identifies a meaning or context so that the data can be readily interpreted, sorted and organized. In other words, name information is not just held in a text string, but instead is identified as a name field; phone numbers are not just numeric or text strings, they are identified as phone numbers.

Accumulator 206 gathers together all the physical record outputs from adapters 303 and collects or coalesces the information into a single record. In a basic form, accumulator 206 may organize the physical records in a local database or row-and-column table structure based upon the record type and content. This record can be displayed to the user using a graphical interface, stored in a local database, forwarded to another location, or the like. Further, this record can be manipulated by optional local processing methods such as sorting, filtering, and the like to reformat the data in a manner more desirable in a particular application.

Figure 4:
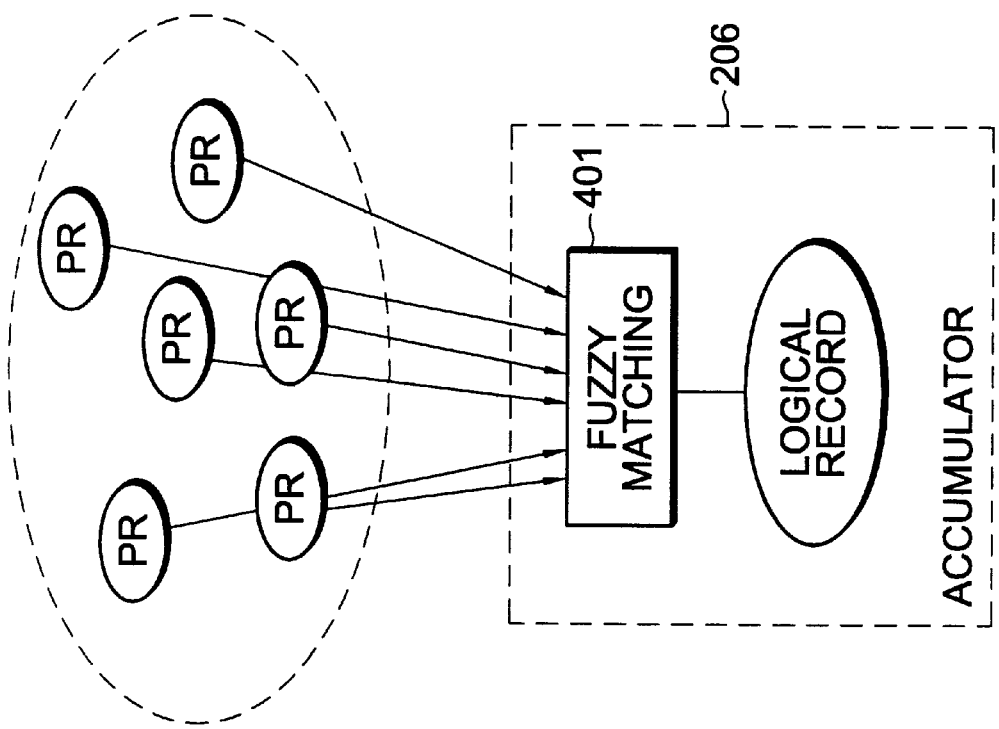
FIG. 4 illustrates in block diagram form details of a particular embodiment of an accumulator device shown in FIG. 2.

FIG. 4 shows a preferred implementation of an accumulator 206. In the implementation shown in FIG. 4, physical records (labeled PR in FIG. 4) are passed to fuzzy matching unit 401. Because the present invention enables one to query many diverse data sources in parallel, the returned results will often comprise a large number of physical records of varying content that may include some duplicative data. For example, one physical record may indicate that "J. E. Smith" having a zip code 80303 is a participating provider while another record indicates that "John Elbert Smith" having a zip code 80303 is another provider. Fuzzy matching unit 401 serves to match relevant records using fuzzy matching criteria.

Particularly where one or more data sources 101 do not provide relevant searchable fields the returned physical records will include many undesired records. For example, if a data source 101 cannot filter its results by zip code, many records will not be relevant to a particular inquiry. With common names, for example, a Large number of the returned physical records will may be of no interest.

Although these records can be manually sorted and categorized to find matching records, this process is time consuming and inaccurate. In a particular implementation to match records including provider names, fuzzy matching unit parses each record to identify a last name, first initial, and zip code. The parsed records are matched or coalesced when a preselected proportion of the parsed information matches between the two (or more) records. Records do not need to be exact matches, however, a sufficient amount of matching should be required to avoid merging records that are in fact separate. Fuzzy matching unit 301 then generates an output comprising one or more "logical records".

Another benefit of fuzzy matching unit 401 is that the output logical record can have greater meaning and utility than any of the individual input physical records. Each data source 101 will generate a record that includes varying amount and kinds of information. For example, one data source may include information that lists what foreign languages are spoken by the practitioner whereas another database may lack the foreign language information, but include medical school history information. The merged logical record will include both these types of information and so is more useful than either database alone.

This feature of fuzzy matching unit 401 enables the present invention to search data sources that may appear at first to be irrelevant to the desired data. For example, a broker may know that a particular insurance carrier (referred to herein as a "non-target carrier) does not offer a small group plan that meets the needs of a particular client. Hence, the broker would not search the non-target carrier's database during the process of aggregating product information. However, the non-target carrier's database may include information about a health care provider that is lacking in the target data sources that the broker actually searches. For example, the non-target carrier may includes information about foreign language skills, but the target carrier(s) may not have such information.

In accordance with the present invention, the broker's query is formulated for the target data sources as described hereinbefore, then optionally the query is augmented by adding query messages addressed to non-target data sources. The system in accordance with the present invention includes adapters 203 for the non-target database used to formulate queries in a manner akin to that described hereinbef-ore. Fuzzy matching unit 401 is used to supplement the data from target data sources with data from the data returned from non-target data sources. In this manner, a logical record is created that includes more information that was available in the target data sources.

Figure 5:
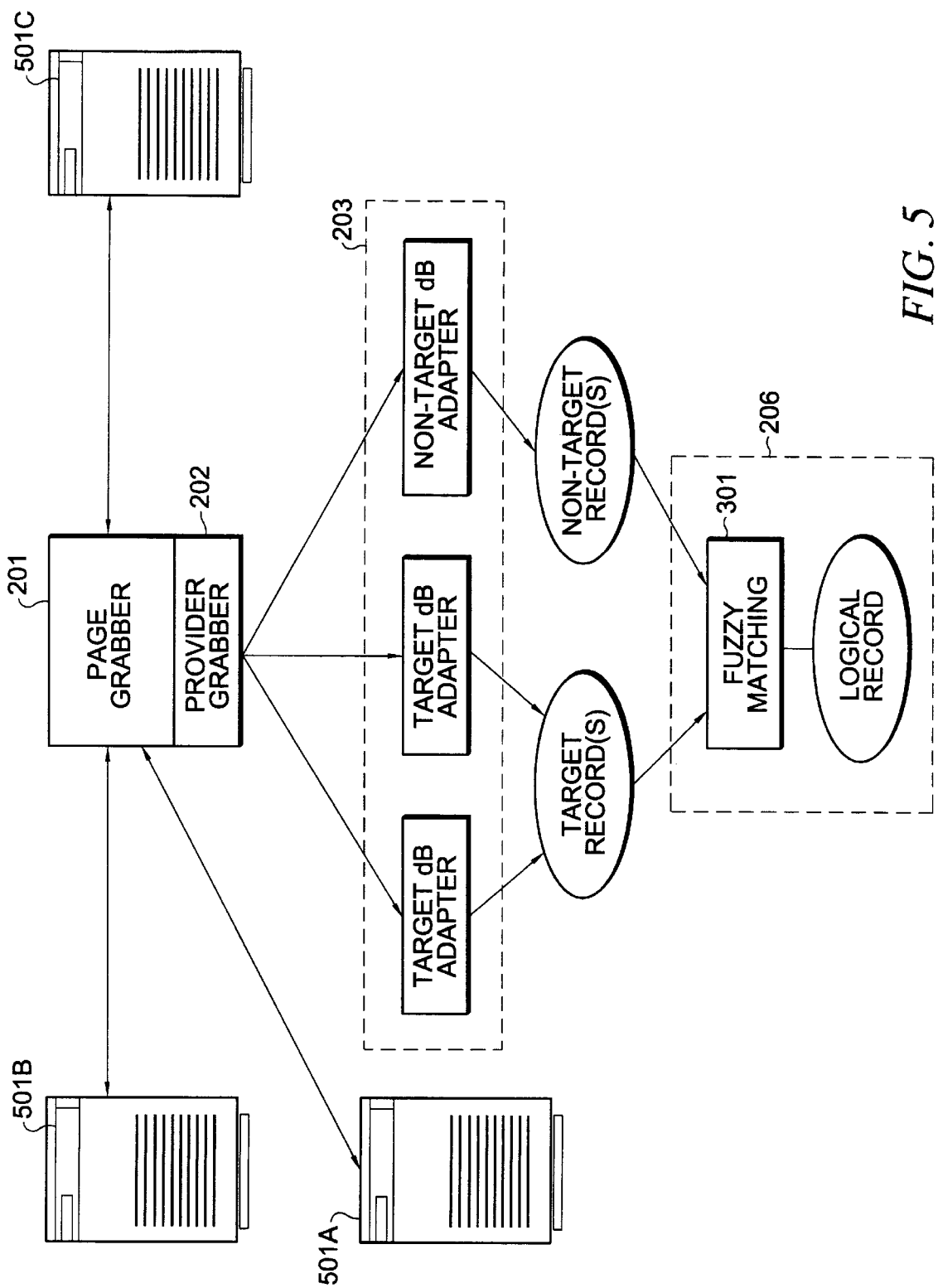
FIG. 5 shows a specific implementation of the systems, methods, and devices in accordance with the present invention.

This feature is illustrated in the system in accordance with the present invention shown in FIG. 5. As shown in FIG. 5, the network environment includes target data sources 501A and 501B and a non-target data source 501C. The user that is attempting to aggregate product data need not even be aware of the existence of non-target data source 501C. As an example, non-target data source 501C may be a simple public yellow pages type database that has a listing for a health care provider that identifies a plurality of office locations or office hours for the health care provider. In contrast, target databases 501A and 501B may have only a single office address and may not list office hours at all.

The user's data request is transformed by page grabber 301 into request messages addressed to both target data sources 501A and 501B as well as non-target database 501C. The return messages are gathered by page grabber 301, processed by provider grabber 302, and passed on to the appropriate adapters 303. Adapters 303 generate a set of target records and a set of non-target records that are coalesced by the fuzzy matching unit 401 to generate a logical record that includes information about the office hours and various office locations.

Further, such information can be used by fuzzy matching unit 401 to aid the process of matching disparate records. For example, a provider might be listed under one address with a first carrier and another address with a second carrier. As in the example above, non-target information taken from a business directory will indicate that both of the target records refer to the same health care provider and enable fuzzy matching unit 401 to properly match the records.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for aggregating distributed information comprising:

identifying a plurality of data sources each having an address;

storing site specific information describing idiosyncrasies of each data source;

receiving a plurality of user criteria including information relating to a target data source;

generating a plurality of query messages to a plurality of data sources based upon the received criteria and the stored idiosyncrasy information, wherein at least one of the plurality of data sources is a non-target data source;

for each query message, generating a communication packet comprising the generated query message and an address for the corresponding data source;

creating a plurality of communication ports with each port associated with one of the communication packets; and sending each communication packet over its associated port to the addressed data source.

2. The method of claim 1 further comprising the step of:

receiving a plurality of responses to the communication packets where each received response is associated with one of the communication ports wherein each response is received in a format defined by the data sources.

3. The method of claim 2 further comprising:

extracting from each response a set of information corresponding to that response; and reformatting each extracted set of data using the stored idiosyncrasy information.

4. The method of claim 3 further comprising a step of performing a fuzzy match on the reformatted data to create associations between data returned by a number of the plurality of data sources.

5. The method of claim 1 wherein at least some query messages result in the generation of a plurality of communication packets.

6. The method of claim 1 wherein the sending is done such that a number of the communication packets are sent in parallel.

7. The method of claim 1 wherein the idiosyncratic information comprises information describing query syntax.

8. The method of claim 1 wherein the idiosyncratic information comprises information describing access syntax.

9. The method of claim 1 wherein the idiosyncratic information comprises information describing return data format of the data source.

10. The method of claim 1 wherein the idiosyncratic information comprises information describing searchable data fields within the data source.

11. The method of claim 1 wherein the step of generating query messages comprises generating an independent query message for each criterion specified for each data source.

12. A computer implemented method of retrieving data from a plurality of data sources comprising the steps of:

identifying a plurality of addressable data sources;

in response to receiving user-supplied search criteria, selecting from the plurality of data sources a set of target data sources specified by the user criteria;

in addition to the target data sources, selecting at least one non-target data source from the plurality of data sources where the non-target data source is not directly required by the user-specified criteria;

performing a data transaction with each of the selected target and non-target databases, the transactions resulting in a plurality of data records being returned from the data sources; and performing a matching operation on the returned records to create a logical record comprising information from both the target and non-target data sources.

* * * * *